United States Patent
Yoon et al.

(10) Patent No.: US 8,522,141 B2
(45) Date of Patent: Aug. 27, 2013

(54) METHOD FOR PROVIDING LINK AND ELECTRONIC APPARATUS THEREOF

(75) Inventors: Soo-yeoun Yoon, Seoul (KR); O-jae Kwon, Seoul (KR); Yoo-tai Kim, Yongin-si (KR); Bong-hyun Cho, Gwangju-si (KR); Gyung-hye Yang, Seoul (KR); Eun-hee Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 12/984,317

(22) Filed: Jan. 4, 2011

(65) Prior Publication Data

US 2011/0209037 A1 Aug. 25, 2011

(30) Foreign Application Priority Data

Feb. 19, 2010 (KR) ........................ 10-2010-0015178

(51) Int. Cl.
*G06F 17/00* (2006.01)
(52) U.S. Cl.
USPC .......................................... 715/273; 715/200
(58) Field of Classification Search
USPC .......................................... 715/200, 255, 273
See application file for complete search history.

(56) References Cited

U.S. PATENT DOCUMENTS

| | | | | |
|---|---|---|---|---|
| 5,706,502 A * | 1/1998 | Foley et al. | .................... | 717/120 |
| 5,991,782 A * | 11/1999 | Miyagawa et al. | ........... | 715/246 |
| 6,088,702 A * | 7/2000 | Plantz et al. | ........................ | 1/1 |
| 6,507,410 B1 * | 1/2003 | Robertson et al. | ........... | 358/1.18 |
| 6,549,220 B1 * | 4/2003 | Hsu et al. | ...................... | 715/854 |
| 6,565,609 B1 * | 5/2003 | Sorge et al. | .................... | 715/234 |
| 6,570,597 B1 * | 5/2003 | Seki et al. | ..................... | 715/835 |
| 7,043,475 B2 * | 5/2006 | Heer et al. | ..................... | 707/737 |
| 7,143,362 B2 * | 11/2006 | Dieberger et al. | ............ | 715/764 |
| 7,228,496 B2 * | 6/2007 | Hamada | ...................... | 715/255 |
| 7,325,193 B2 * | 1/2008 | Edd et al. | ....................... | 715/255 |
| 7,499,845 B1 * | 3/2009 | Quincy et al. | ..................... | 703/7 |
| 7,509,575 B2 * | 3/2009 | Makela | ......................... | 715/238 |
| 7,890,850 B1 * | 2/2011 | Bryar et al. | .................... | 715/207 |
| 7,996,753 B1 * | 8/2011 | Chan et al. | .................... | 715/200 |
| 8,065,611 B1 * | 11/2011 | Chan et al. | .................... | 715/253 |
| 8,312,660 B1 * | 11/2012 | Fujisaki | ....................... | 42/70.11 |
| 2004/0015785 A1 * | 1/2004 | Lin | ............................... | 715/530 |
| 2004/0141016 A1 * | 7/2004 | Fukatsu et al. | ................. | 345/856 |

(Continued)

FOREIGN PATENT DOCUMENTS

WO 03/094040 A1 11/2003

OTHER PUBLICATIONS

Abe et al., Content-based Management of Video in a Multimedia Authoring Environment, Google 1996, pp. 199-214.*

(Continued)

*Primary Examiner* — Cong-Lac Huynh
(74) *Attorney, Agent, or Firm* — Sughrue Mion, PLLC

(57) ABSTRACT

A method for providing a link in an electronic apparatus capable of reproducing contents, includes storing a first part of a first contents in a link storage area, forming a link between a second part of a second contents and the first part stored in the link storage area, and if the link is selected, displaying the first part while a contents screen including the second part is displayed. Accordingly, a user may easily find related contents from among contents stored in the electronic apparatus as a link is formed between related contents.

24 Claims, 18 Drawing Sheets

(56) References Cited

U.S. PATENT DOCUMENTS

| | | | |
|---|---|---|---|
| 2005/0102364 A1* | 5/2005 | Ozzie et al. | 709/207 |
| 2005/0289446 A1* | 12/2005 | Moncsko et al. | 715/501.1 |
| 2006/0075326 A1* | 4/2006 | Patel et al. | 715/501.1 |
| 2006/0150085 A1* | 7/2006 | Davis et al. | 715/513 |
| 2006/0224997 A1 | 10/2006 | Wong et al. | |
| 2007/0073746 A1* | 3/2007 | Ahn et al. | 707/100 |
| 2008/0098018 A1* | 4/2008 | King et al. | 707/101 |
| 2008/0229190 A1* | 9/2008 | Johnson | 715/238 |
| 2009/0193325 A1* | 7/2009 | Fume | 715/205 |
| 2011/0055742 A1* | 3/2011 | Tomono | 715/766 |
| 2011/0066968 A1* | 3/2011 | Goldsmith et al. | 715/781 |
| 2011/0173547 A1* | 7/2011 | Lewis et al. | 715/752 |
| 2011/0187511 A1* | 8/2011 | Boldyrev et al. | 340/10.51 |
| 2011/0271095 A1* | 11/2011 | Bharat et al. | 713/150 |
| 2012/0084373 A1* | 4/2012 | Chen et al. | 709/206 |
| 2012/0102429 A1* | 4/2012 | Naderi et al. | 715/783 |
| 2012/0109884 A1* | 5/2012 | Goldentouch | 707/608 |
| 2012/0120430 A1* | 5/2012 | Tsai | 358/1.13 |
| 2012/0124125 A1* | 5/2012 | Smith et al. | 709/203 |
| 2012/0151308 A1* | 6/2012 | Falkenberg et al. | 715/201 |

OTHER PUBLICATIONS

Haas et al., Page and Link Classifications: Connecting Diverse Resources, ACM 1998, pp. 99-107.*

Park et al., "Web Information Management System: Personalization and Generalization, Google 2003, pp. 523-530.*

Mothe et al., Structuration and Enrichment of HTML Documents in order to Build a Specific Information Warehouse, Google 2000, pp. 1-10.*

Borghoff et al., Structure Management in the Collaborative Multimedia Editing System IRIS, Google 1993, pp. 1-15.*

Schilit et al., Web Interaction Using Very Small Internet Devices, IEEE 2002, pp. 37-45.*

European Search Report issued in corresponding application No. 11151077.2 on May 18, 2011.

Kahan et al. "Annotea: an open RDF infrastructure for shared Web annotations". Computer Networks. Elsevier Science Publishers B.V., Amsterdam. vol. 39, No. 5. Aug. 5, 2002. pp. 589-608.

Carr et al. "Implementing an open link service for the World Wide Web". Baltzer Science Publishers. Bussum, NL. vol. 1, No. 2. Jun. 1, 1998. pp. 61-71.

Kopetzky et al. "Visual preview for link traversal on the World Wide Web." Computer Networks. Elsevier Science Publishers B.V. Amsterdam, NL. vol. 31, No. 11-16. May 17, 1999. pp. 1525-1532.

* cited by examiner

METHOD FOR PROVIDING LINK AND ELECTRONIC APPARATUS THEREOF

CROSS-REFERENCE TO RELATED APPLICATIONS

This application claims the benefit of Korean Patent Application No. 2010-15178, filed in the Korean Intellectual Property Office on Feb. 19, 2010, the disclosure of which is incorporated herein by reference.

BACKGROUND

1. Field

Aspects of the exemplary embodiments relate to an electronic apparatus and a method for providing links thereof, and more particularly, to an electronic apparatus which reproduces and displays image contents and audio contents and a method for providing links thereof.

2. Description of the Prior Art

Electronic apparatuses having an E-book function generally store a considerable amount of contents. As a user stores a large number of image contents and audio contents in a single apparatus, the user may reproduce various contents through the single electronic apparatus.

However, it is not easy for the user to find the contents that he or she wants to reproduce because a large amount of contents may be stored in the apparatus. For instance, if the user desires to find contents related to what he or she is currently working on, the user must remember where the related contents are stored. However, it is extremely difficult for the user to find the related contents from among various contents. If the user does not remember where the related contents are located, the user is unable to find the related content and he or she must generate the contents all over again.

In order to address one of the above issues, a function to highlight sentences or post a memo is introduced. Although this function may help the user to find the contents he or she wants to reproduce, it does not help the user to find the related contents. Accordingly, a method for helping the user to find the related contents is required.

SUMMARY

Aspects of the exemplary embodiments relate to a method for providing links in which part of contents are stored in a link storage area, and the stored part is linked to other part of other contents and an electronic apparatus using the same.

A method for providing a link in an electronic apparatus which is capable of reproducing a plurality of contents, according to an exemplary embodiment of the present invention, includes storing a first part of a first one of the plurality of contents in a link storage area, forming a link between a second part of a second one of the plurality of contents and the first part stored in the link storage area, and displaying the first part on the contents screen which includes the second part, if the link is selected while a contents screen which includes the second part is displayed.

The storing may store a thumbnail image of the first part of the first contents in the link storage area.

The forming a link may include displaying a link generation icon on the second part, displaying the link storage area if the link generation icon is selected, and forming a link between the second part and the first part if the thumbnail image of the first part stored in the link storage area is selected.

The method may comprise displaying a connection icon on the contents screen which includes the second part, if the link is formed between the second part and the first part, and the displaying may display the first part on the contents screen which includes the second part if the displayed connection icon is selected while the contents screen which includes the second part is displayed.

The method may further include converting the contents screen which includes the second part into a contents screen which includes the first part, if a first part displayed on a contents screen including the second part is selected.

The storing may include registering a tag relating to the first part in the thumbnail image of the first part and storing the registered tag along with the thumbnail image of the first part in the link storage area.

The first contents may be the same as the second contents.

The contents may be image contents or audio contents.

The electronic apparatus may be an E-book device.

An electronic apparatus, according to an exemplary embodiment of the present invention, includes a display unit, and a controlling unit which stores a first part of a first one of the plurality of contents in the link storage area, forms a link between a second part of a second one of the plurality of contents and the first part stored in the link storage area, and if the link is selected while a contents screen which includes the second part is displayed, the first part is displayed on the contents screen which includes the second part.

The controlling unit may store a thumbnail image of the first part of the first contents in the link storage area.

The electronic apparatus may further include a GUI unit to generate a link generation icon, and the controlling unit may generate a link generation icon on the contents screen which includes the second part, and if the link generation icon is selected, the controlling unit may display the link storage area, and if the thumbnail image of the first part stored in the link storage area is selected, the controlling unit may form a link between a second part of the second contents and the first part of the first contents.

If the link is formed between the second part and the first part, the controlling unit may display a connection icon on the contents screen which includes the second part, and if the connection icon is selected while the contents screen which includes the second part is displayed, the controlling unit may display the first part on the contents screen which includes the second part.

The controlling unit may convert the contents screen which includes the second part into a contents screen which includes the first part.

The electronic apparatus may further include a manipulation unit to receive a user's command, and the controlling unit may register a tag relating to the first part in a thumbnail image of the first part according to a user's command received through the manipulation unit, and stores the registered tag along with the thumbnail image of the first part.

The first contents may be are the same as the second contents.

The contents may be image contents or audio contents.

The electronic apparatus may be an E-book device.

The displaying the first part may include displaying the first part to overlap the second part.

If the link is selected while the contents screen which includes the second part is displayed, the first part may be displayed to overlap the second part.

DETAILED DESCRIPTION OF THE EXEMPLARY EMBODIMENTS

Figure 1A:
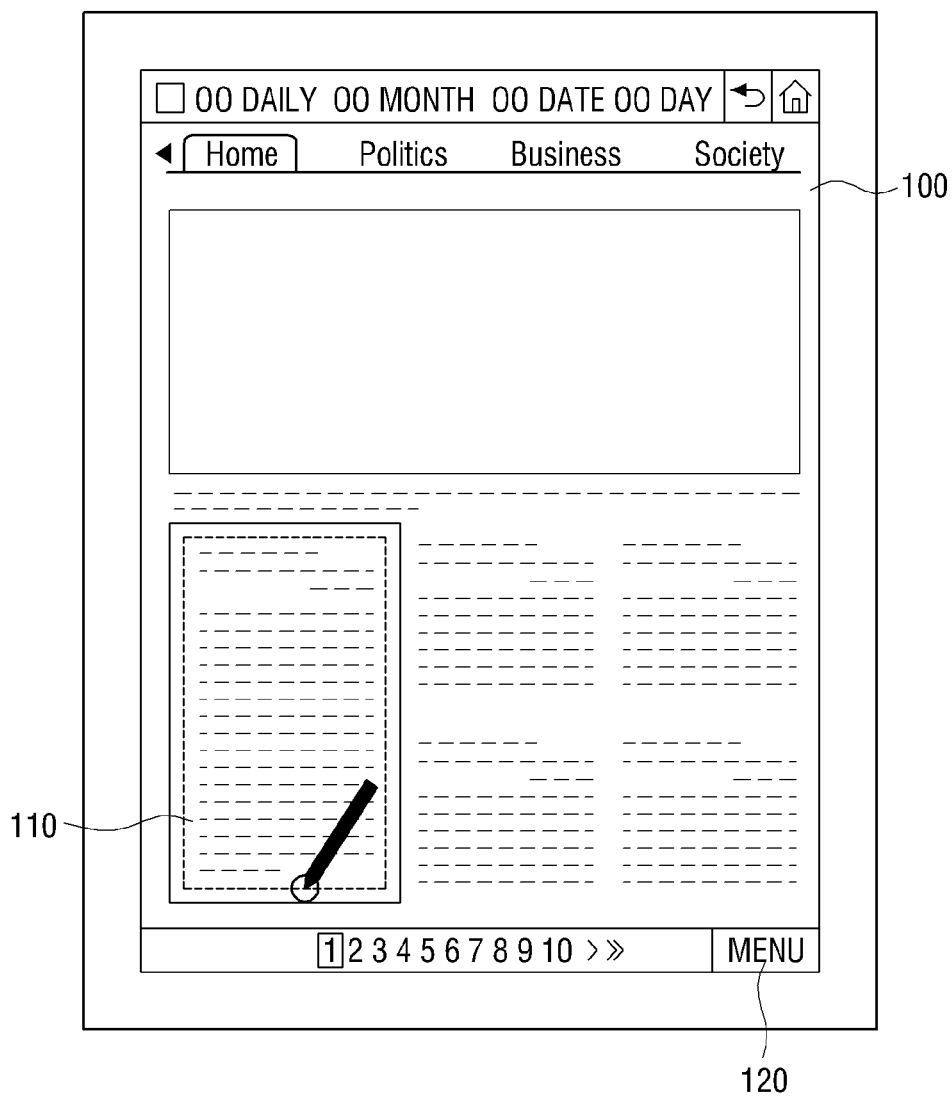
FIG. 1A to FIG. 1G are views provided to explain a method for providing links between related image contents in an E-book device with a single display according to an exemplary embodiment.

Reference will now be made in detail to the exemplary embodiments, examples of which are illustrated in the accompanying drawings, wherein like reference numerals refer to like elements throughout. The exemplary embodiments are described below, in order to explain the present invention by referring to the figures.

FIG. 1a to FIG. 1g are views provided to explain a method for providing links between related image contents in an E-book device with a single display according to an exemplary embodiment.

FIG. 1a illustrates a device displaying image contents and includes a display 100 for displaying currently reproduced image contents and a menu 120 for inputting a user's command. The screen 100 displays a screen for reproducing image contents. The contents include E-book contents such as a newspaper article and a novel, or music contents which are combined with images.

In addition, the display 100 includes the first part 110 to which a user wants to link. The first part is the part that the user stores in a link storage area. The link storage area is the area in which the user stores and preserves parts 130-1, 130-2, 130-3 that are selected by the user to form links.

If the first part 110 is touched and dragged, the first part 110 is selected as illustrated in FIG. 1a. The selected part 110 may be stored in the link storage area. Specifically, if an icon for storing in the link storage area in the menu 120 is selected though a user's manipulation, the selected first part 110 is stored in the link storage area.

The first part 110 may be stored in the form of a thumbnail. Specifically, the thumbnail refers to a captured image of the first part. In addition, the first part 110 may be stored in the link storage area in the form of a thumbnail in which its brief information and generation date are included. The brief information includes the title of the main contents of the first part and the generate date which refers to the date when the first part is created in a thumbnail.

When the first part 110 is stored, tag information may be stored with the first part 110. The tag information includes meaning information of the first part 110 which is stored through a touch panel. The tag information refers to metadata which includes information relating to the first part. For instance, if the first part is about the history of the Middle Ages, the E-book device may store "the Middle Ages" and "history" through the touch panel as tag information together with the first part 110.

As explained above with regard to FIG. 1A, after the first part is stored in the link storage area 130, the user searches for contents again. If contents in relation with the first part are searched as illustrated in FIG. 1b, a link may be formed such that the first part corresponds to the second part.

Figure 1B:
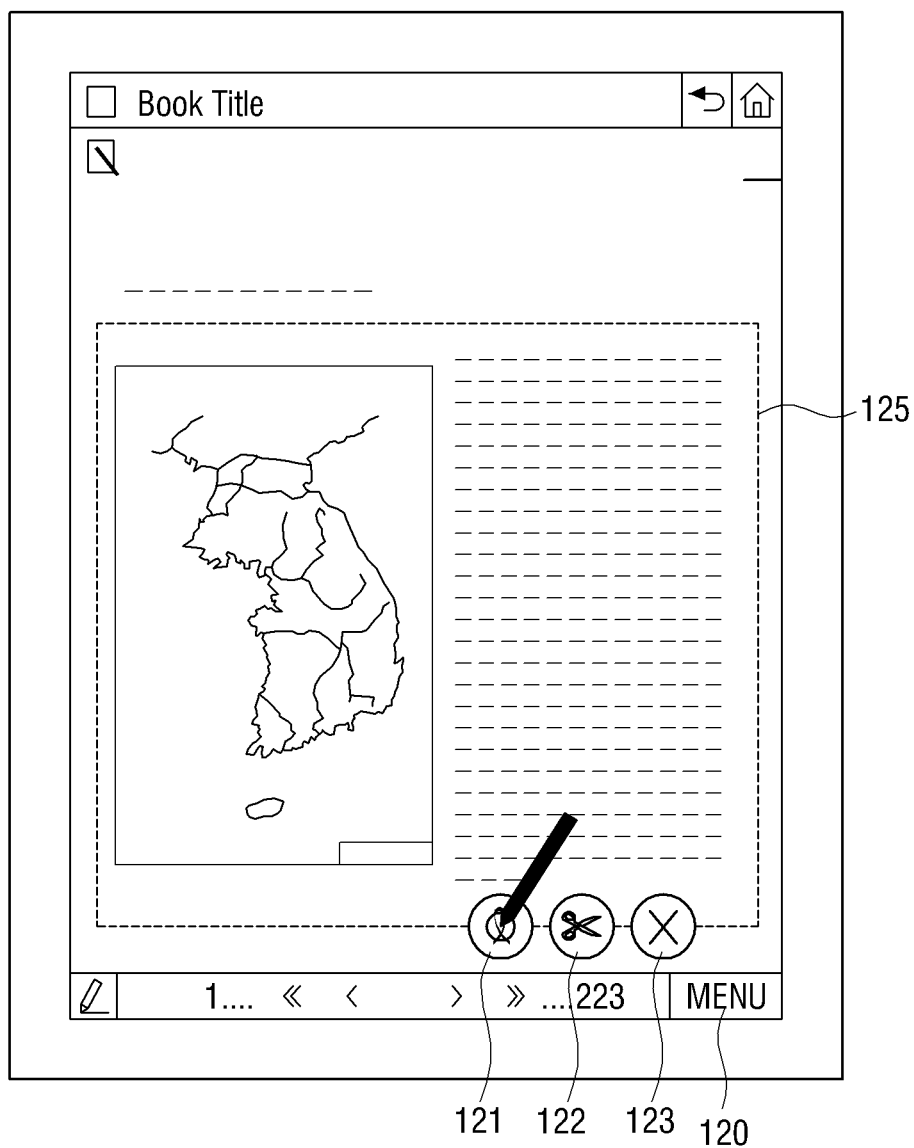

Specifically, FIG. 1B is a view illustrating a screen which includes the second part 125 used to form a link. Specifically, the second part is the part selected by the user from the second contents to form a link with the first part stored in the link storage area 130. The second contents may be the same as the first contents.

As illustrated in FIG. 1B, the second part 125 includes a plurality of icons 121, 122, and 123. The plurality of icons 121, 122, and 123 include an icon to generate a link 121, an icon to cut 122, and an icon to delete 123. The icon to generate a link 121 is an icon displayed in a contents screen including the second part in order to form a link between the first part and the second part. However, this is only an example, and the second part may include icons capable of performing other functions.

Figure 1C:
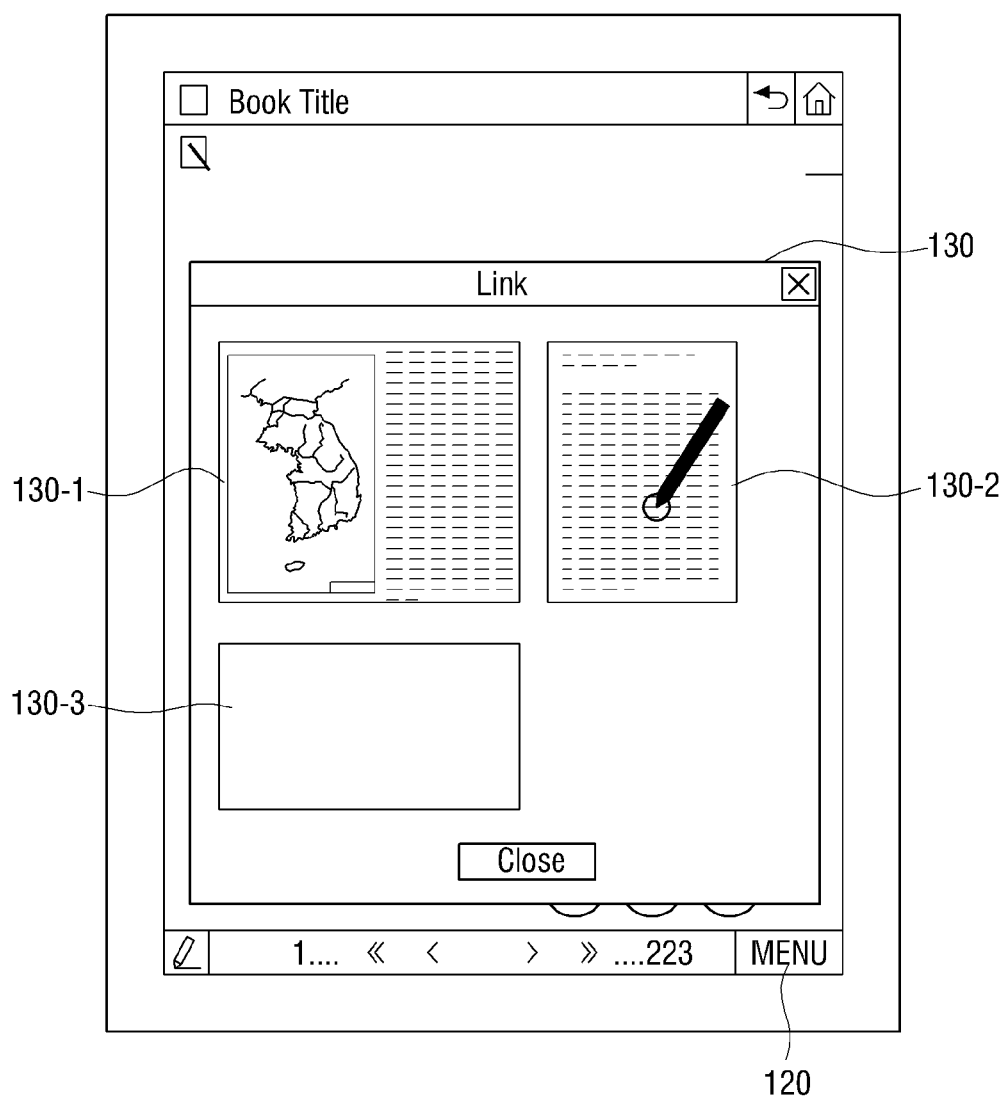

If the icon to generate a link 121 is selected, e.g., touched twice in a row, a link storage area 130 is displayed as illustrated in FIG. 1C. If the thumbnail of the first part 130-2 is touched twice in a row in the link storage area 130, a link is formed such that the first part 110 is associated with the second part 125.

Figure 1D:
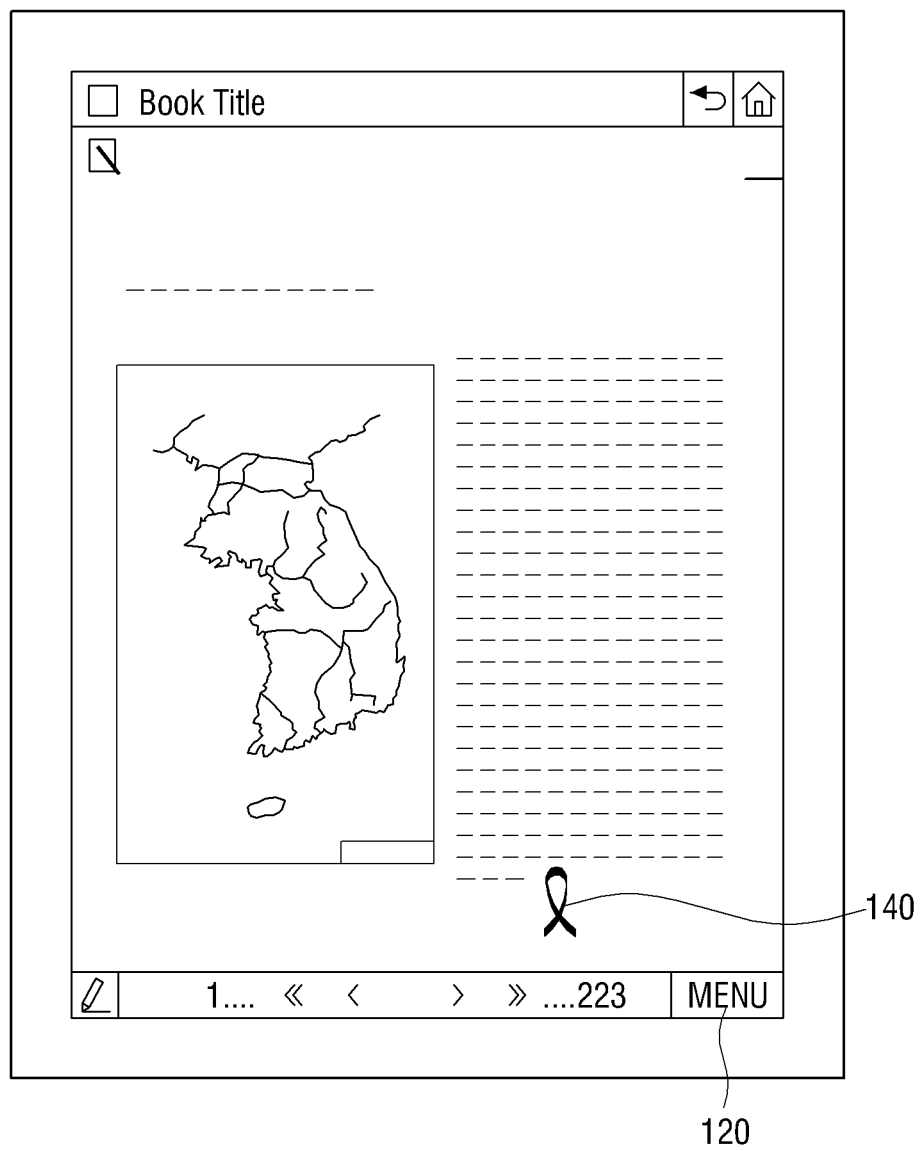
Figure 1E:
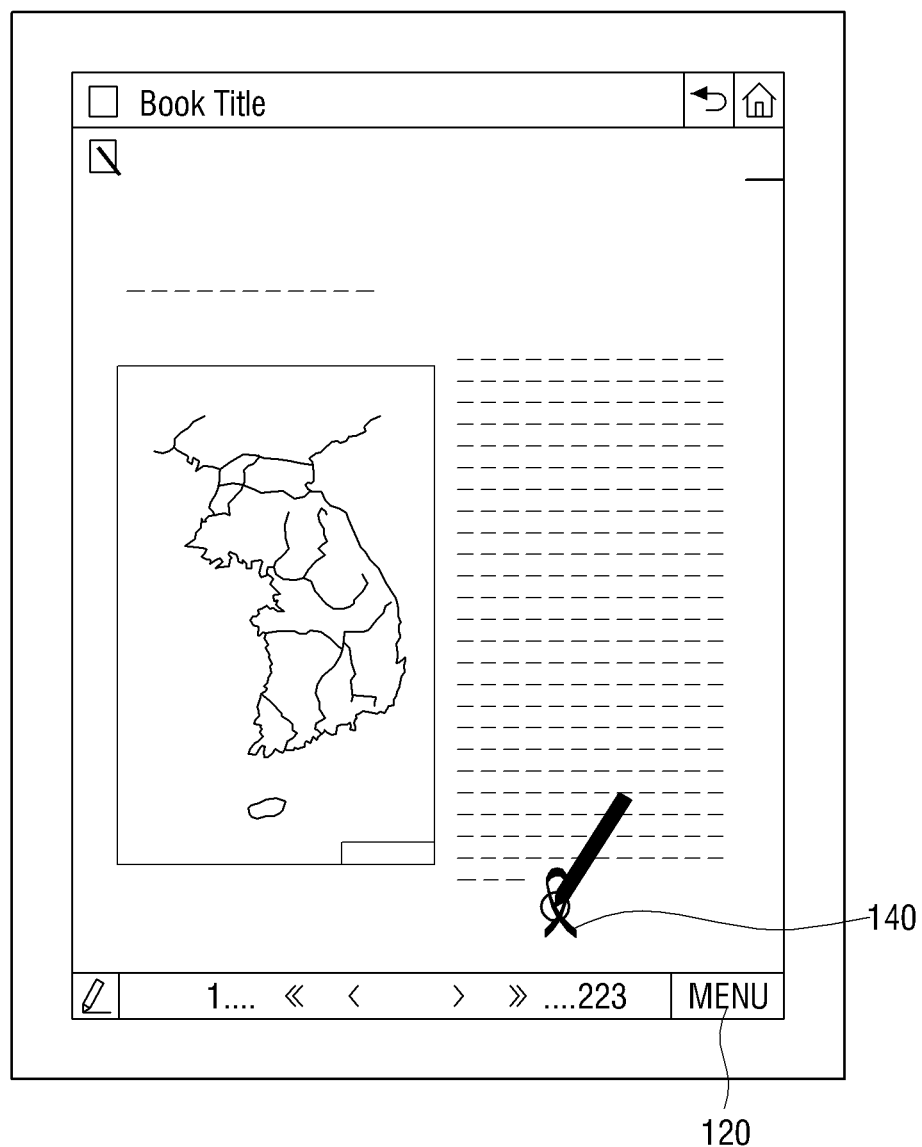

FIG. 1D illustrates a screen including the second part 125 which has a link. As illustrated in FIG. 1D, if a link is formed such that the first part 110 is associated with the second part 125, a connection icon 140 is displayed on the screen including the second part 125. Accordingly, if the connection icon 140 is touched twice as illustrated in FIG. 1E, a link is executed.

Figure 1F:
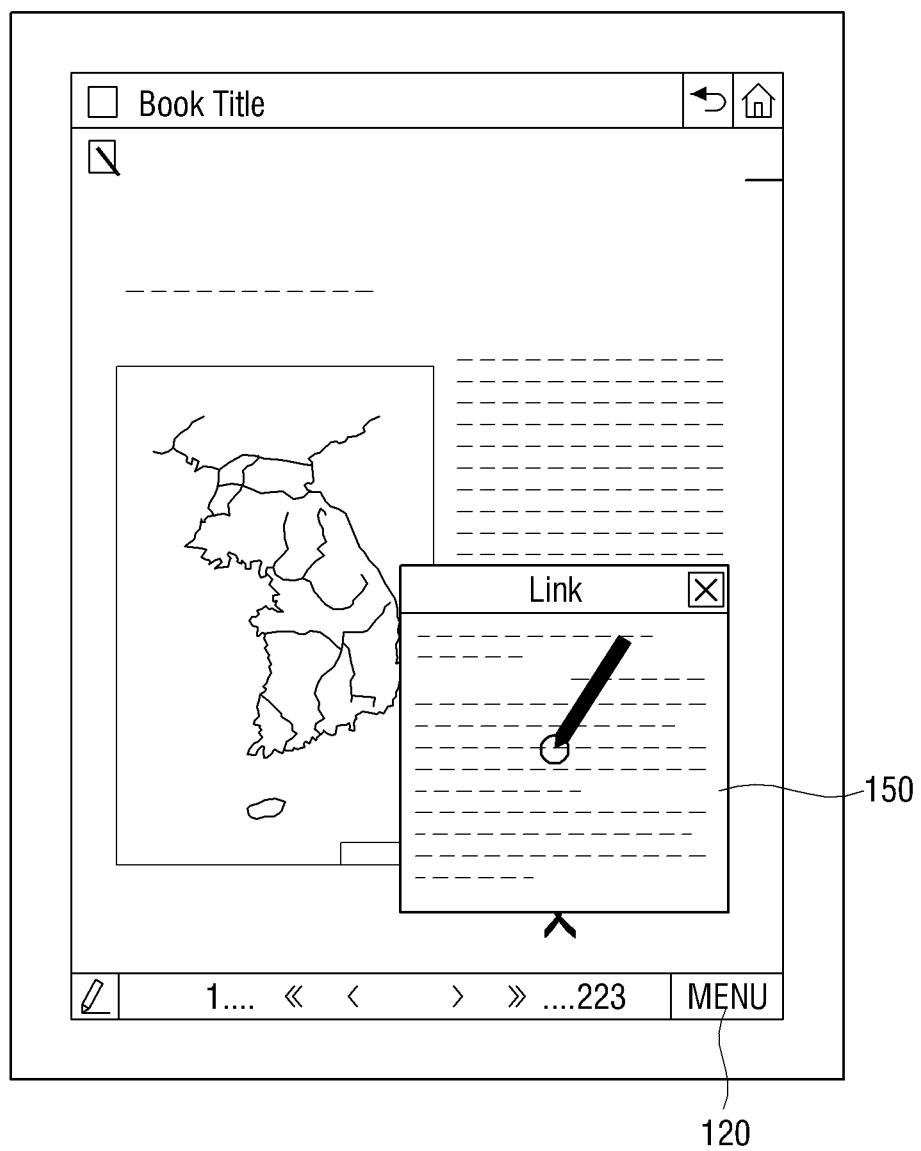

FIG. 1F is a view illustrating execution of a link after the connection icon 140 is touched twice. As illustrated in FIG. 1F, the first part 150 is displayed while the screen including the second part is displayed and such that the first part 150 overlaps the second part. The first part 150 may be in the form of a thumbnail or preview.

Figure 1G:
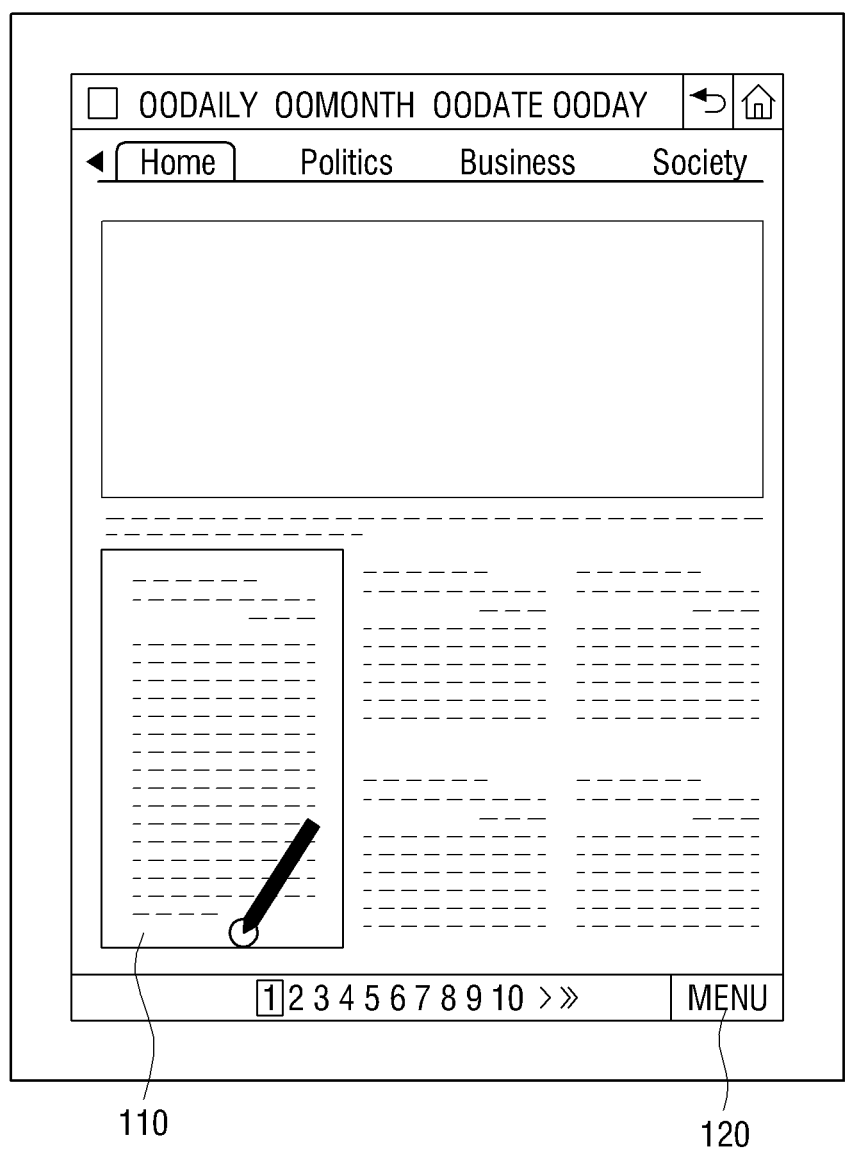

If the first part 150 in FIG. 1F is touched twice in a row, the screen is changed into a screen including the first part 110 and then displayed as illustrated in FIG. 1G. Specifically, if the first part 150 in FIG. 1F is touched twice in a row, the E-book device changes the screen including the second part 125 into a screen including the first part 150 and displays the first part 150 and not the second part 125.

Accordingly, the user may easily find related contents in the E-book device by forming a link between the related contents.

FIG. 2A to FIG. 2D are views provided to explain the process of providing links between image contents and audio contents in an E-book device with a single display. The method for storing image contents in the link storage area 210 is the same as explained in FIG. 1A.

According to the method for storing audio contents in the link storage area 210, a user may open audio contents that he or she wants to link and store them in the link storage area. When audio contents are stored in the link storage area, the title, reproduction time, and generation date of the audio contents may be stored in the link storage area in the form of a thumbnail.

Figure 2A:
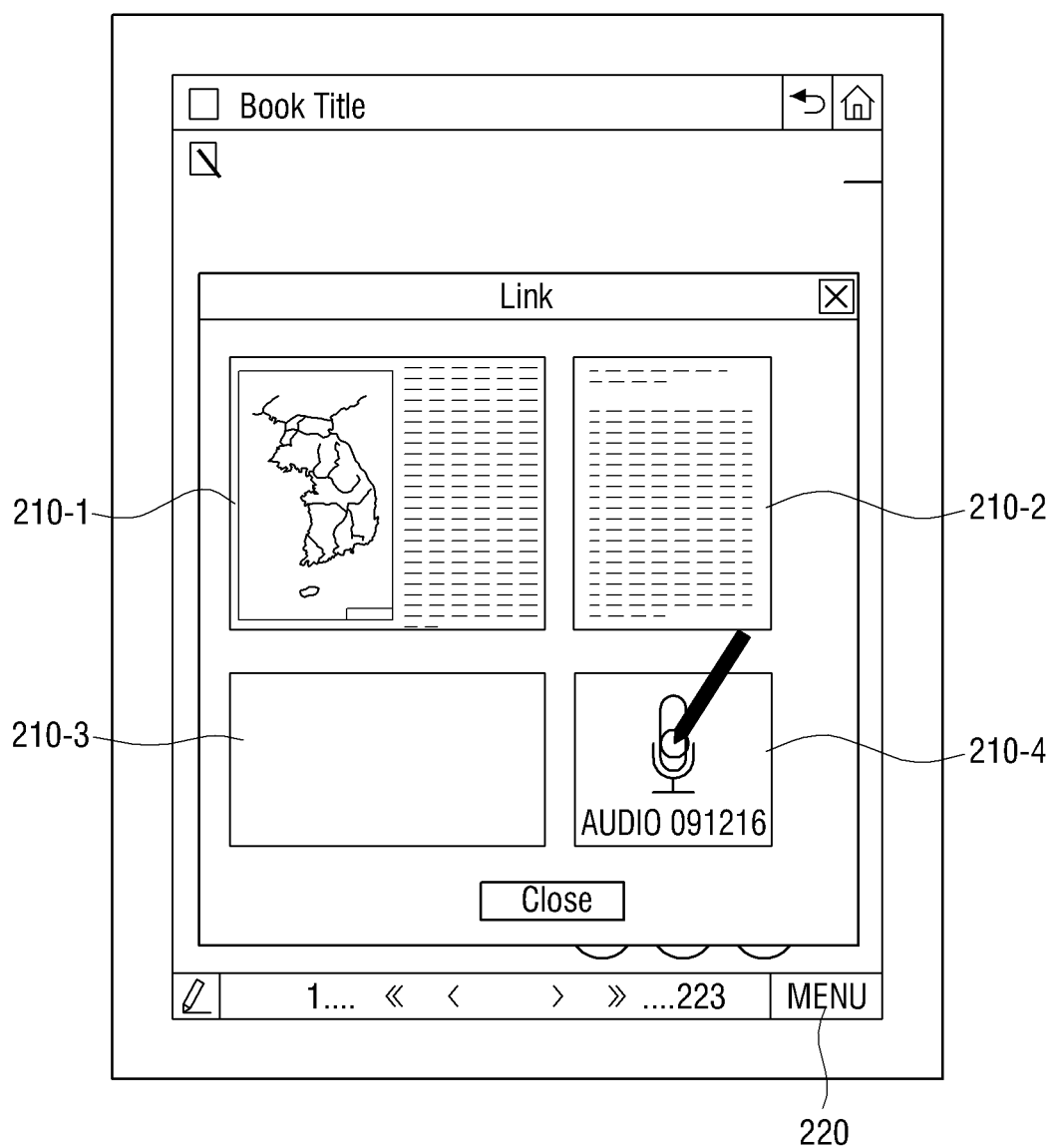
FIG. 2A to FIG. 2D are views provided to explain a method for providing links between image contents and audio contents in an E-book device with a single display according to an exemplary embodiment.

If a user touches the link generation icon 121 twice to form a link between a certain part of a content and an audio content as illustrated in FIG. 1B, the link storage area 210 is displayed as illustrated in FIG. 2A.

FIG. 2A is a view illustrating the link storage area 210 including contents with which the user wants to form a link. As illustrated in FIG. 2A, the link storage area 210 includes a plurality of image contents with which the user wants to form a link 210-1, 210-2, 210-3 and the thumbnail of an audio content 210-4.

Figure 2B:
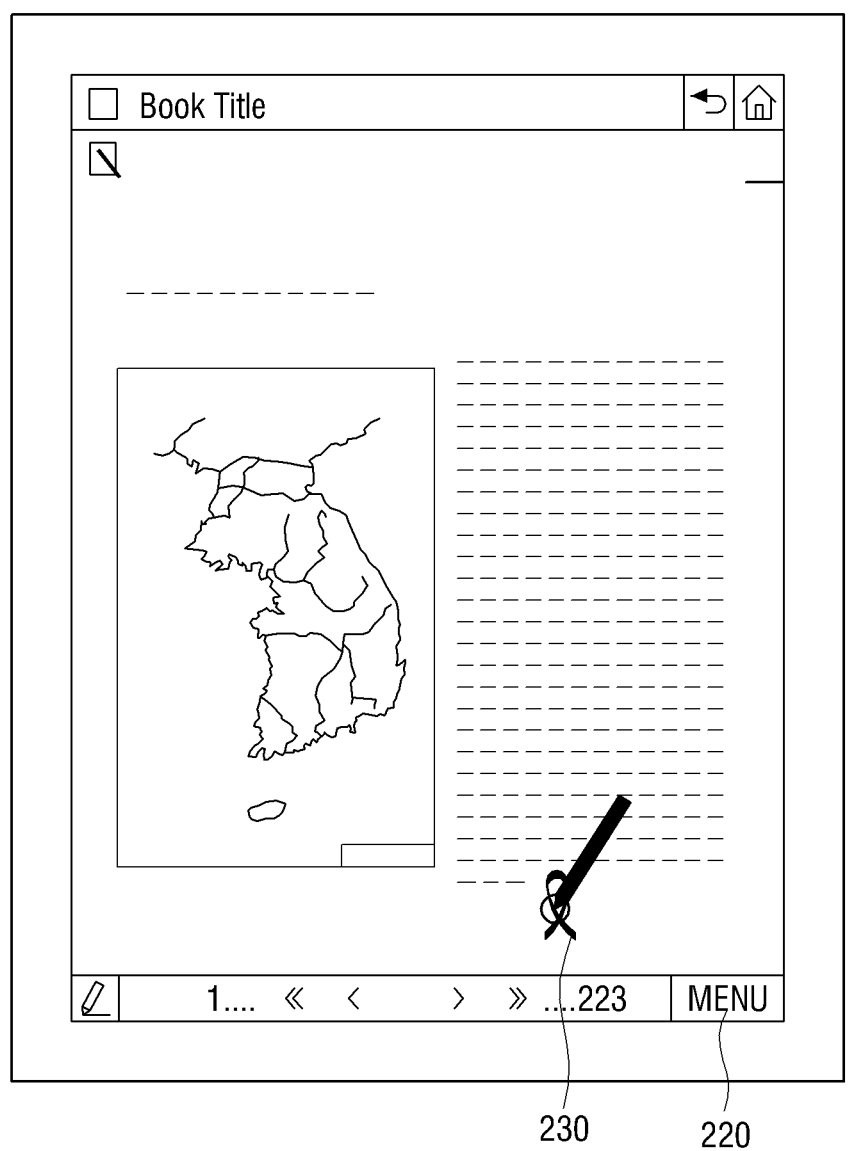

If the user touches the thumbnail of the audio content 210-4 twice in a row, the connection icon 230 is generated on a screen which includes the part with which the user wants to form a link from among the plurality of image contents as illustrated in FIG. 2B.

Figure 2C:
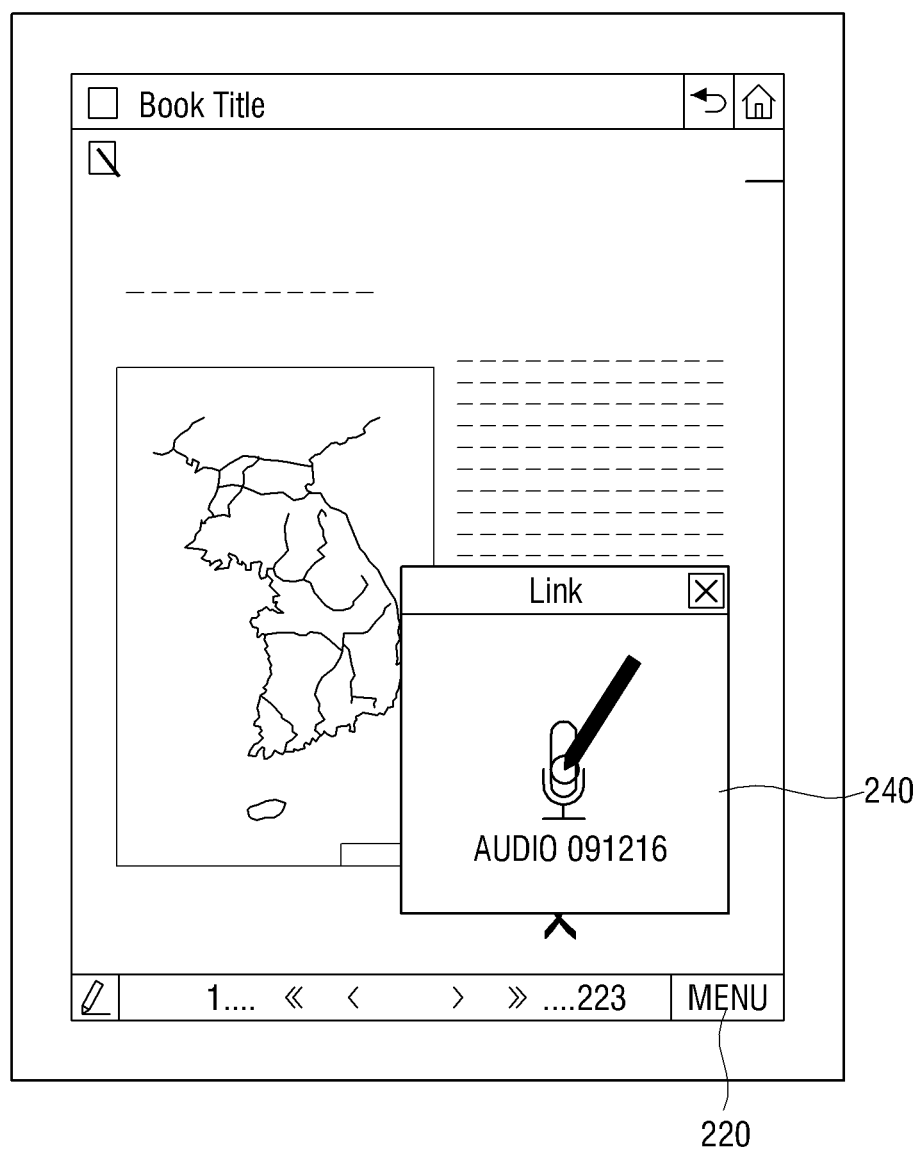

If the user touches the connection icon 230 in FIG. 2B twice in a row, the thumbnail of the linked audio content 240 is displayed as illustrated in FIG. 2C. In this case, the audio contents may be reproduced at the same time the thumbnail of the audio contents is displayed. After a predetermined time elapses, the thumbnail of the audio content disappears as illustrated in FIG. 2B.

Figure 2D:
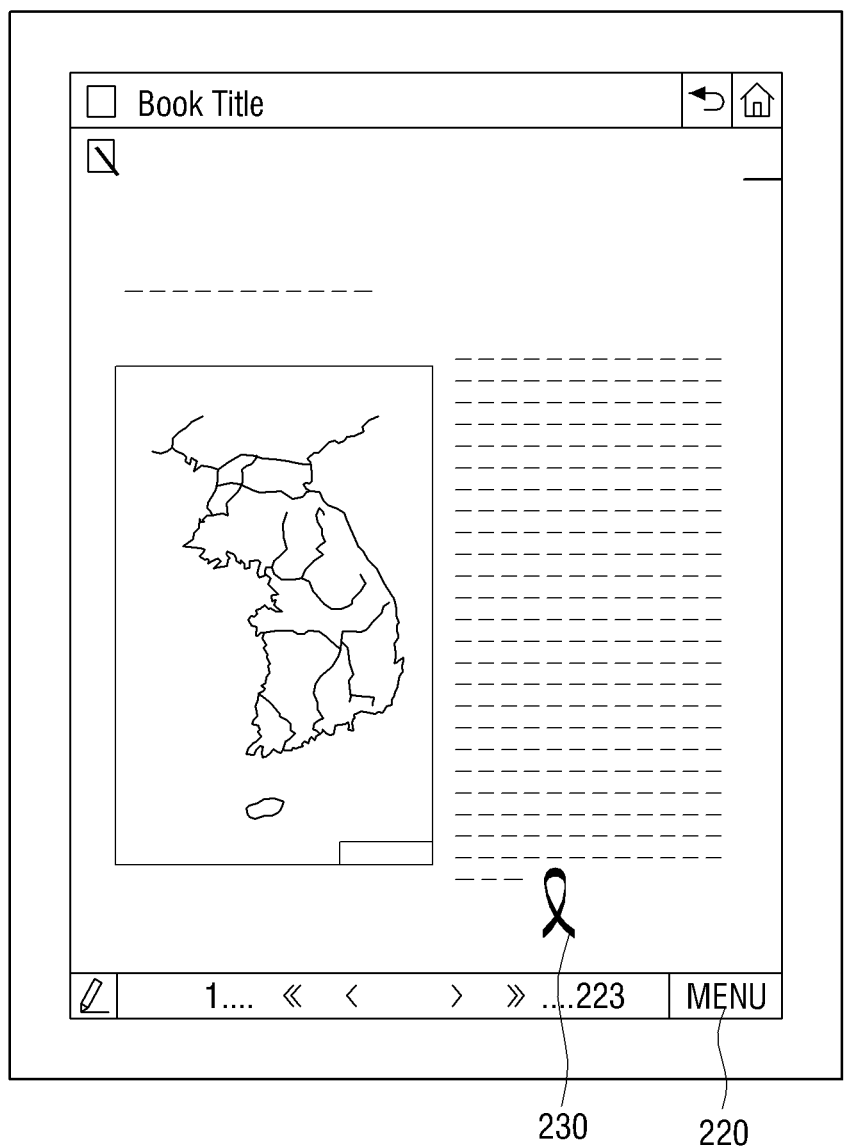

Alternatively, audio content may be reproduced if the thumbnail 240 of the audio content illustrated in FIG. 2C is touched twice in a row. If the thumbnail 240 of the audio content is touched twice in a row, the thumbnail 240 of the audio content disappears as illustrated in FIG. 2D and the audio content is reproduced.

As described above, a link is formed between related image contents and audio contents, and thus a user may easily find related contents and audio contents from among image contents and audio contents stored in an E-book device.

FIG. 3A to FIG. 3D are views provided to explain the process of providing links between image contents in an E-book device with two displays according to an exemplary embodiment.

Figure 3A:
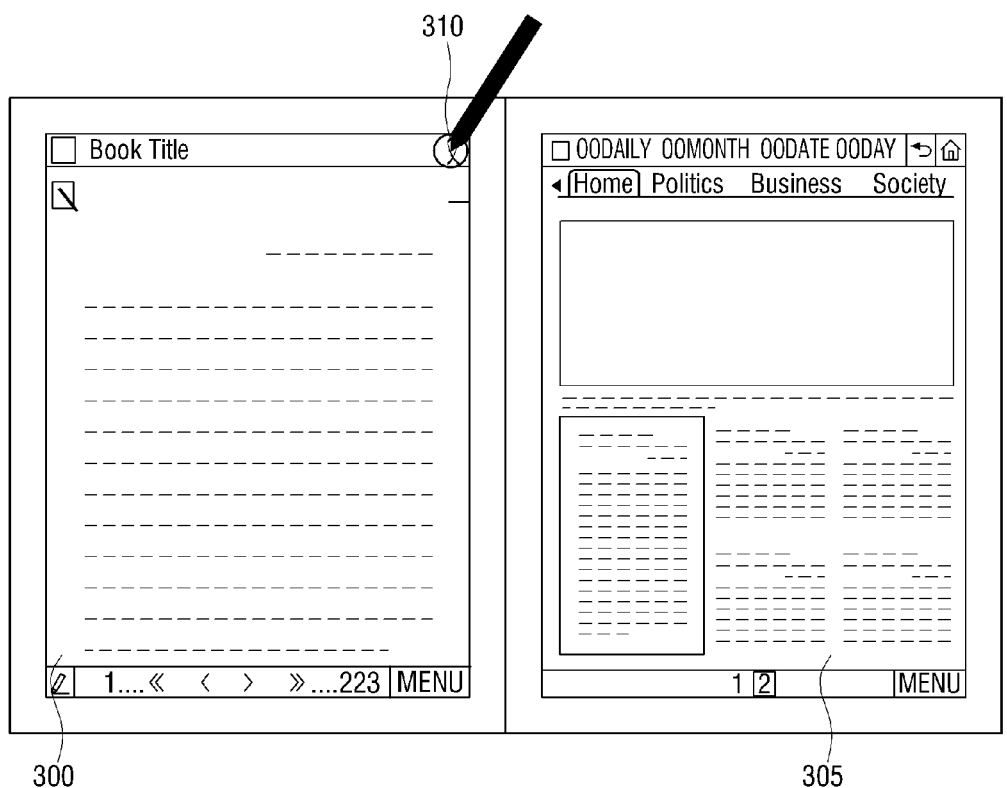
FIG. 3a to FIG. 3d are views provided to explain the process of providing links between image contents in an E-book device with two displays according to an exemplary embodiment.

As illustrated in FIG. 3A, the E-book device includes two electronic paper displays (EPDs) 300, 305, and different contents are reproduced on the EPDs 300, 305. However, this is only an example, the same contents may be displayed on EPDs 300, 305.

If a user touches a link icon 310 located in the upper right corner of the left EPD 300 twice in a row, a link formation state is activated. In the link formation state, a user may designate the first part and the second part to form a link.

Figure 3B:
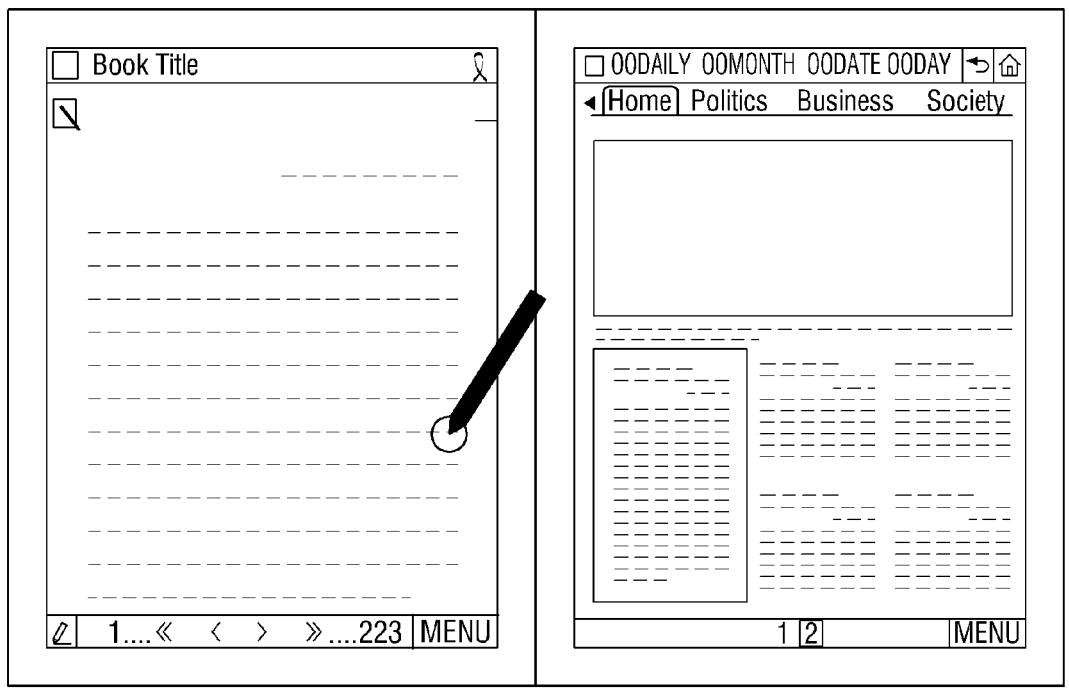
Figure 3C:
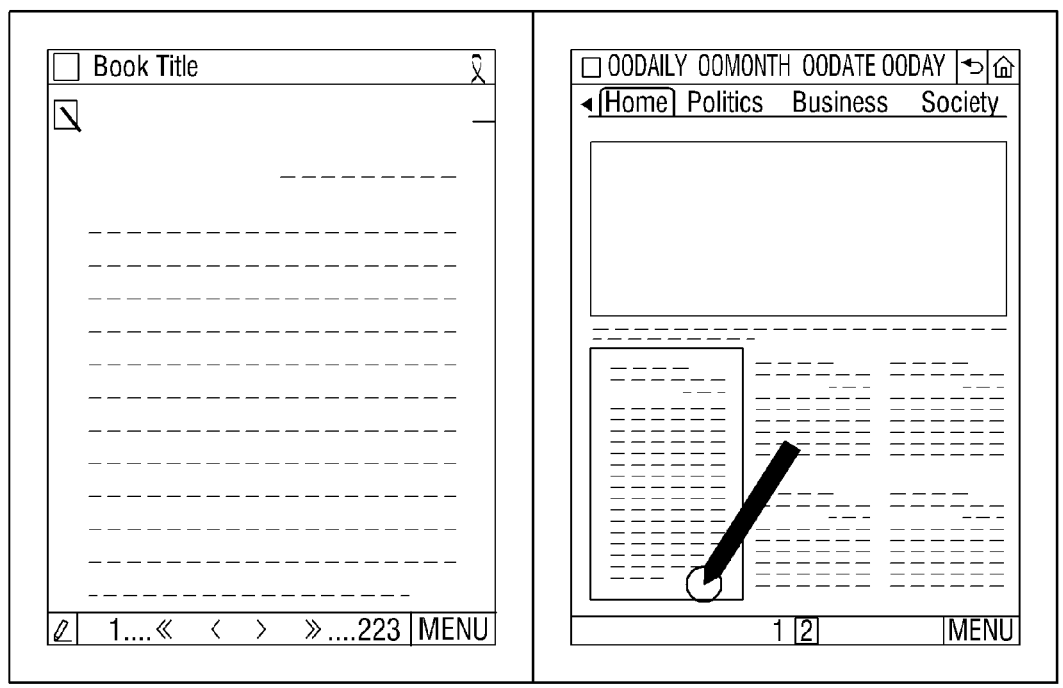

For instance, if a certain part of the left EPD 300 is touched twice in a row as illustrated in FIG. 3B, the certain part of the left EPD 300 is designated as the first part for forming a link, and if a certain part of the right EPD 305 is touched twice in a row as illustrated in FIG. 3C, the certain part of the right EPD 305 is designated as the second part for forming the link.

Figure 3D:
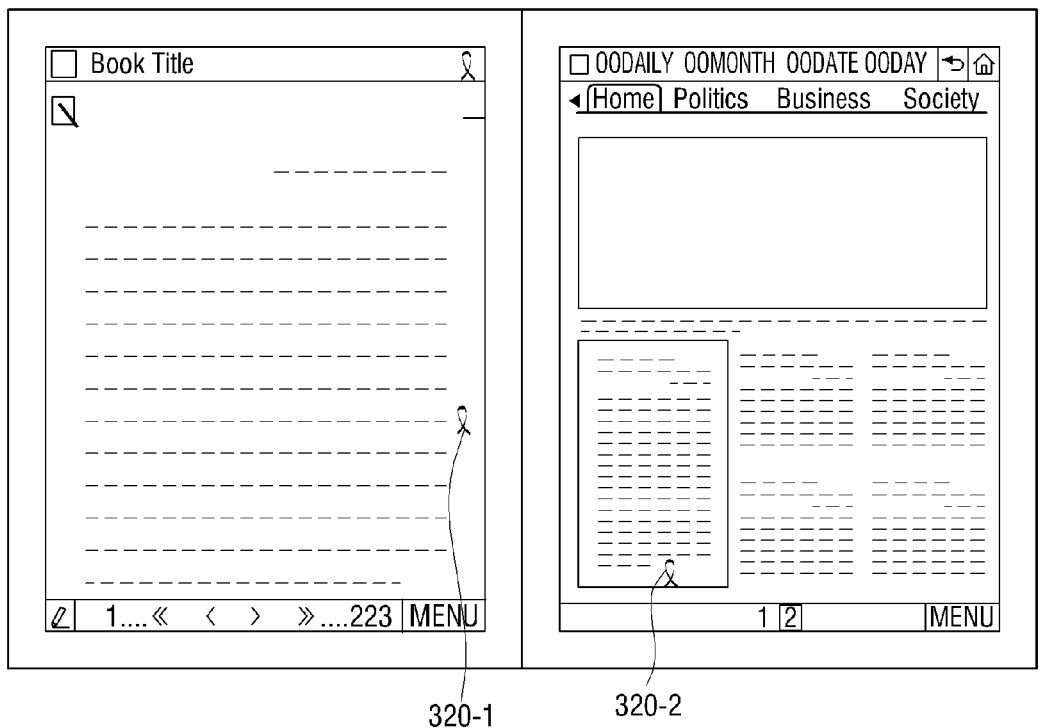

As the first part and the second part are selected as described above, a link is formed between the first part and the second part. Once the link is formed, the connection icons 320-1, 320-2 are generated on the first part and the second part respectively, as shown in FIG. 3D. If one of the connection icons 320-1, 320-2 is selected, the part connected through the link is displayed. Specifically, if the connection icon 320-1 on the left EPD 305 is selected while a screen that does not include the second part is displayed on the right EPD 305, the right EPD 305 is converted to a screen which includes the linked second part.

Accordingly, as a link is formed between related contents, a user may easily find related contents from among contents stored in an E-book device.

Figure 4:
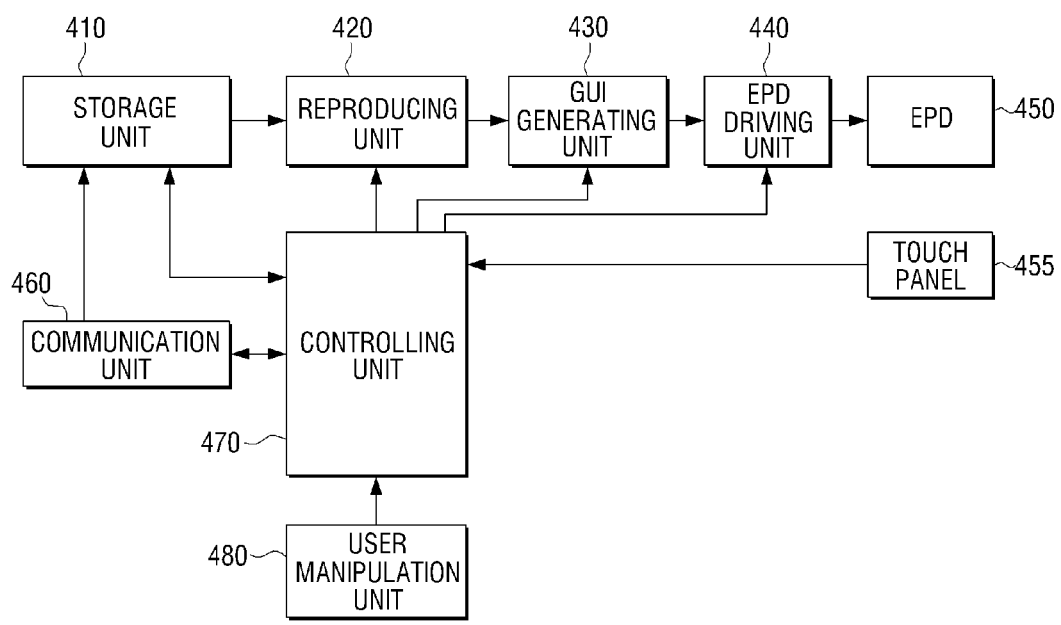
FIG. 4 is a block diagram of an E-book with a single display according to an exemplary embodiment.

FIG. 4 is a block diagram of an E-book with a single display according to an exemplary embodiment. As illustrated in FIG. 4, the E-book device comprises a storage unit 410, a reproducing unit 420, a GUI generating unit 430, an EPD driving unit 440, an EPD 450, a touch panel 455, a communication unit 460, a controlling unit 470 and a user manipulation unit 480.

The storage unit 410 provides a space for storing contents, and includes not only a built-in storage element but also a detachable storage element. The contents stored in the storage unit 410 include not only an E-book but also still and moving images. In addition, the storage unit 410 may include a link storage area for storing a thumbnail that captures a certain part of the contents.

The reproducing unit 420 reproduces and outputs contents stored in the storage unit 410. If contents are stored in the storage unit in a compressed format, the reproducing unit 420 decompresses the compressed contents.

The GUI generating unit 430 generates a GUI and adds the generated GUI to the contents output from the reproducing unit 420. The operation of a GUI by the GUI generating unit 430 is controlled by the controlling unit 470 which will be explained later.

Specifically, the GUI generating unit 430 generates an icon to store a link storage area, an icon to generate a link, and an icon for connection.

The EPD driving unit 440 displays the contents to which a GUI from the GUI generating unit 430 is added distinctively on the EPD 450.

The touch panel 455 is formed on the EPD 450 as described above, and senses a user's touch which is input through the EPD 450. The touch panel 455 transmits the sensed user manipulation to the controlling unit 470.

The communication unit 460 is communicably connected to an external apparatus or an external network.

The user manipulation unit 480 includes physical means to receive a user's command, and includes manipulation buttons formed on the case of an E-book device. The user manipulation unit may be integrated with the touch panel 455.

The controlling unit 470 controls the operation of an E-book device according to a user's command input through the touch panel 455 and the user manipulation unit 480.

The controlling unit 470 causes the first part of the contents to be stored in a link storage area. Specifically, if the first part is selected through a touch panel, the controlling unit 470 stores the selected first part in the link storage area according to the user's command.

In addition, the controlling unit 470 causes a link to be formed between the second part in other contents and the first part stored in the link storage area. Specifically, if a link connection icon is touched twice while a screen including the second part is displayed, the controlling unit 470 causes the link storage area to be displayed. If the first part with which a user desires to form a link is touched twice in a row, the controlling unit 470 causes a link to be formed between the first part and the second part.

If a connection icon is touched twice in a row while a link is formed, the controlling unit 470 causes the first part to be displayed while a screen including the second part is displayed.

If the first part is touched twice in a row while a screen including the second part is displayed, the controlling unit 470 causes a screen including the first part to be displayed while the screen including the second part is displayed.

In addition, the controlling unit 470 may cause the first part to be stored in a link storage area in a captured thumbnail. The thumbnail may include the title, brief information, main image of the first part, for example.

The controlling unit 470 enables a tag regarding the first part to be registered in the thumbnail through the touch panel 455. In addition, the controlling unit 470 causes the registered tag to be stored with the thumbnail of the first part. For instance, if the first part is about the history of the Middle Ages, the tag information of "the Middle Ages" and "history" may be stored with the thumbnail of the first part through the touch panel 455.

Other functions of the controlling unit 470 will be explained in detail with reference to FIG. 6.

Figure 5:
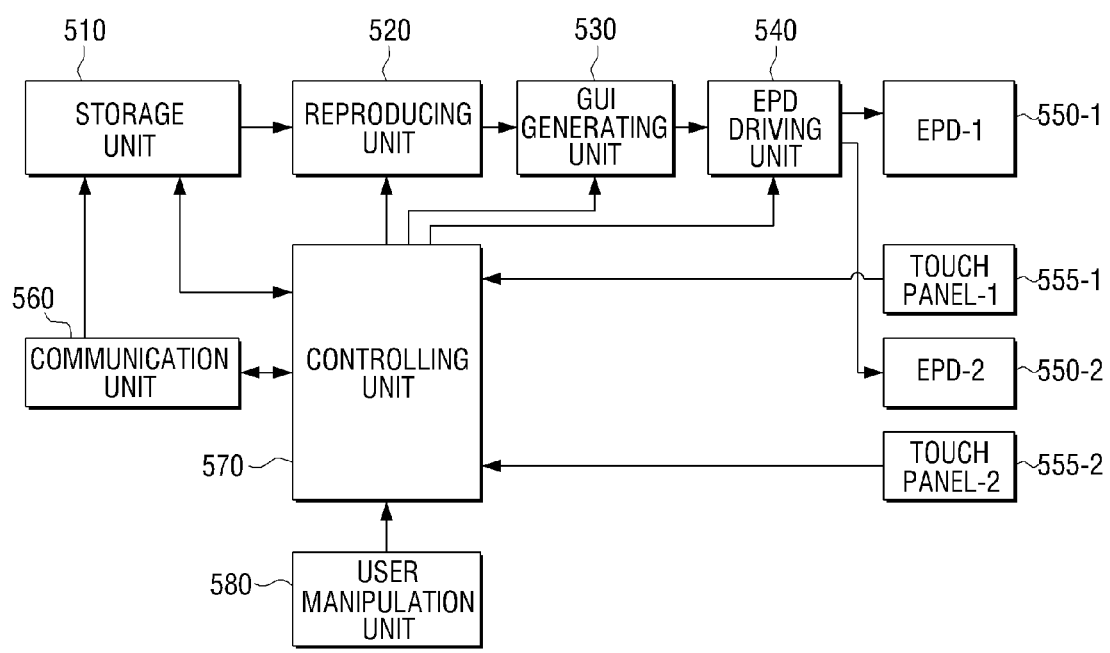
FIG. 5 is a block diagram of an E-book with two displays according to an exemplary embodiment.

FIG. 5 is a block diagram of an E-book with two displays according to an exemplary embodiment. The E-book device with two displays comprises a storage unit 510, a reproducing unit 520, a GUI generating unit 530, an EPD driving unit 540, two EPDs 550-1, 550-2, two touch panels 555-1, 555-2, a communication unit 560, a controlling unit 570, and a user manipulation unit 580.

The functions of the storage unit 510, the reproducing unit 520, the GUI generating unit 530, the EPD driving unit 540, the two EPDs 550-1, 550-2, the two touch panels 555-1, 555-2, the communication unit 560, the controlling unit 570, and the user manipulation unit 580 in the E-book device illustrated in FIG. 5 are the same as those explained in FIG. 4.

Figure 6:
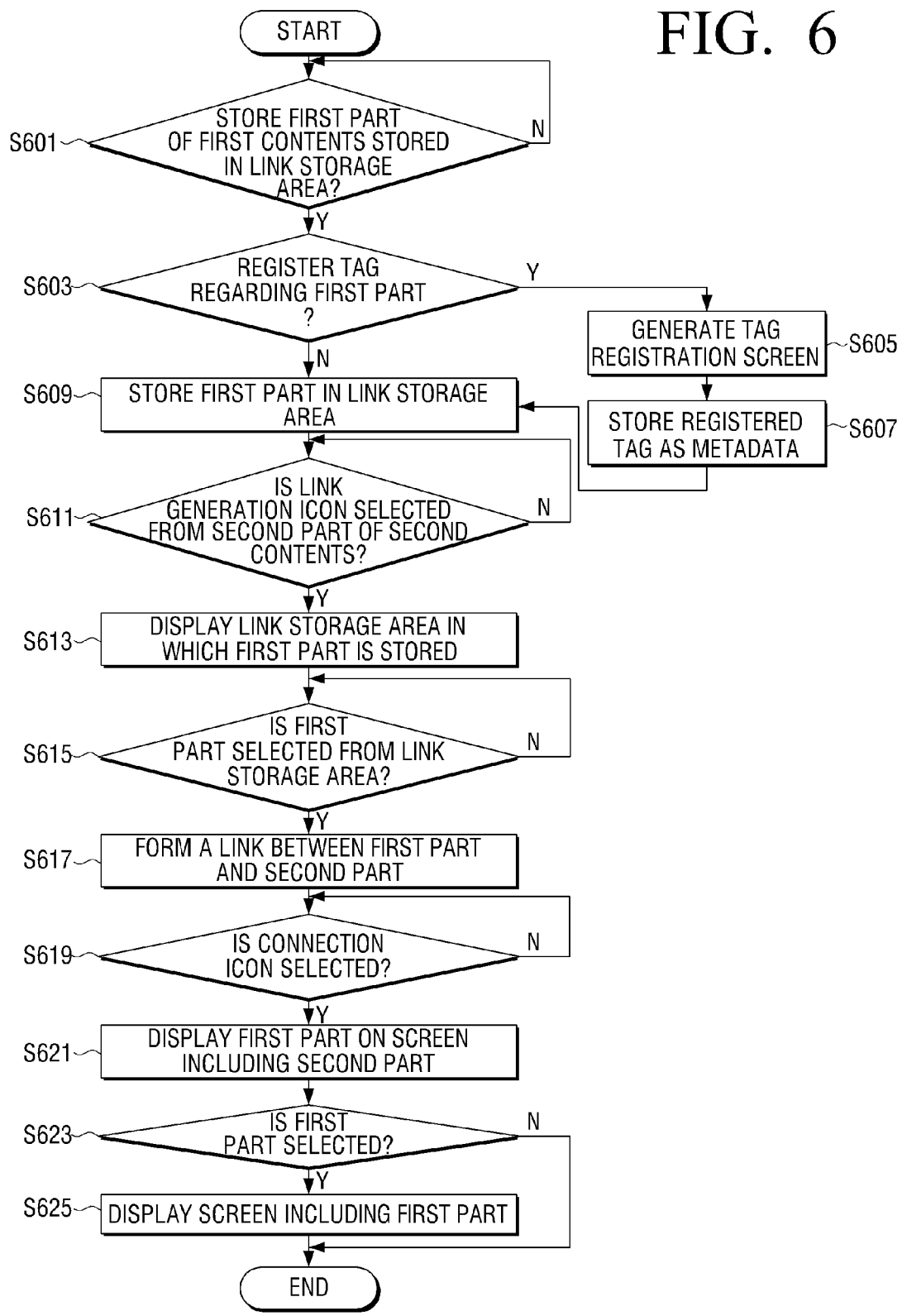
FIG. 6 is a flow chart of a method for providing links in an E-book device according to an exemplary embodiment.

FIG. 6 is a flow chart provided to explain a method for providing links in an E-book device according to an exemplary embodiment.

The E-book device determines whether to store the first part of the first contents in a link storage area (S601). If it is determined that the first part of the first contents is to be stored in the link storage area according to a user's manipulation (S601-Y), the E-book device determines whether to register a tag regarding the first part (S603). If it is determined that the tag regarding the first part is to be registered according to a user's manipulation (S603-Y), the E-book device displays a screen for registering a tag (S605).

If a tag is registered on the screen for registering a tag through a user's manipulation, the E-book device stores the registered tag along with the first part in the storage unit 410 as metadata (S607). The metadata refers to data information about data.

Once tag registration is completed, or if it is determined that the first part should not be registered (S603-N), the E-book device stores the first part in the link storage area (S609). The link storage area refers to an area in which the part a user desires to form a link with is stored.

After the first part is stored in the link storage area, the E-book device determines whether an icon to generate a link regarding the second part of the second contents is selected through a user's manipulation (S611). In this case, the first contents may be the same as the second contents.

If the icon to generate a link is selected in the second part of the second contents (S611-Y), the E-book device displays the link storage area in which stored the first part is stored (S613). The E-book device determines whether the first part is selected in the displayed link storage area (S615).

If the first part is selected through a user's manipulation (S615-Y), a link is formed between the first part and the second part (S617). Once the link is formed, the E-book device displays the connection icon together with the second part on the screen.

If the displayed connection icon is selected through a user's manipulation (S619-Y), the E-book device displays it along with the first part on the screen including the second part (S621). Specifically, the E-book device displays the first part stored in the step of S609 in the form of thumbnail or preview while the screen including the second part is displayed, in an overlapping manner.

If the first part displayed in the form of thumbnail or preview is selected through a user's manipulation (S623-Y), the E-book device converts the screen including the second part into the screen including the first part and displays the first part and not the second part (S625).

As a user forms a link between related contents through the above-mentioned processes, the user may easily find related contents from among the plurality of contents stored in an E-book device.

In the above description, the electronic apparatus has been limited to an E-book device, but this is only an exemplary embodiment. The technical feature may be applied not only to an E-book device but also to other electronic apparatuses which could reproduce image contents or audio contents.

Additionally, in the above description, an icon is selected by touching it twice, but this is also just an exemplary embodiment. The technical feature may be applied when an icon is selected using other methods than touching it twice in a row. For instance, an icon may be selected by touching the icon for a prolonged period of time.

In the above description, the manipulation unit which receives a user's command is limited to a touch panel, but this is only an example. The technical feature may be applied to other manipulation apparatus than a touch panel. For instance, the manipulation apparatus could be a mouse or a pointing device.

According to the exemplary embodiments, a link is formed between related contents, and thus a user may easily find related contents among contents stored in an electronic apparatus.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A method for providing a link in an electronic apparatus which is capable of reproducing a plurality of contents, the method comprising:
   selecting a first part of the plurality of contents;
   storing the first part in a link storage area;
   forming a link between a second part of the plurality of contents and the first part stored in the link storage area when the first part is selected; and
   displaying the first part on the contents screen which includes the second part, if a connection icon is selected while a contents screen including the second part is displayed.

2. The method according to claim 1, wherein the storing comprises storing a thumbnail image of the first part of the first contents in the link storage area.

3. The method according to claim 2, wherein the forming the link comprises:
   displaying a link generation icon on the second part;
   displaying the link storage area if the link generation icon is selected; and
   forming a link between the second part and the first part if the thumbnail image of the first part stored in the link storage area is selected.

4. The method according to claim 2, wherein the storing, comprising:
   registering a tag relating to the first part in the thumbnail image of the first part; and
   storing the registered tag along with the thumbnail image of the first part in the link storage area.

5. The method according to claim 1, comprising:
   displaying the connection icon on the contents screen which includes the second part, if the link is formed between the second part and the first part,
   wherein the displaying displays the first part on the contents screen which includes the second part if the displayed connection icon is selected while the contents screen which includes the second part is displayed.

6. The method according to claim 5, further comprising: converting the contents screen which includes the second part into a contents screen which includes the first part, if the first part displayed on the contents screen which includes the second part is selected.

7. The method according to claim 1, wherein the first contents are the same as the second contents.

8. The method according to claim 1, wherein the contents are image contents or audio contents.

9. The method according to claim 1, wherein the electronic apparatus is an E-book device.

10. The method according to claim 1, wherein the displaying the first part displays the first part to overlap the second part.

11. The method according to claim 1 further comprising selecting the first part and the second part to be linked based on a user requirement and the forming of the link comprises forming the link based on the user requirement.

12. The method according to claim 1 further comprising displaying the link storage area on the contents screen.

13. An electronic apparatus, comprising:
a display unit; and
a controlling unit which selects a first part a plurality of contents, stores the selected first part in a link storage area, forms a link between a second part of the plurality of contents and the first part stored in the link storage area when the first part is selected, and if a connection icon is selected while a contents screen which includes the second part is displayed, the first part is displayed on the contents screen which includes the second part.

14. The electronic apparatus according to claim 13, wherein the controlling unit stores a thumbnail image of the first part of the first contents in the link storage area.

15. The electronic apparatus according to claim 14, wherein the electronic apparatus further comprises:
a GUI unit to generate a link generation icon,
wherein the controlling unit generates a link generation icon on the contents screen which includes the second part, and if the link generation icon is selected, the controlling unit displays the link storage area, and wherein if the thumbnail image of the first part stored in the link storage area is selected, the controlling unit forms the link between a second part of the second content and the first part of the first content.

16. The electronic apparatus according to claim 14, further comprising:
a manipulation unit to receive a user's command,
wherein the controlling unit registers a tag relating to the first part in the thumbnail image of the first part according to a user's command received through the manipulation unit, and stores the registered tag along with the thumbnail image of the first part.

17. The electronic apparatus according to claim 13, wherein if the link is formed between the second part and the first part, the controlling unit displays the connection icon on the contents screen which includes the second part, and if the connection icon is selected while the contents screen which includes the second part is displayed, the controlling unit displays the first part on the contents screen which includes the second part.

18. The electronic apparatus according to claim 17, wherein the controlling unit converts the contents screen which includes the second part into a contents screen which includes the first part, if the first part is selected on the contents screen including the second part.

19. The electronic apparatus according to claim 13, wherein the first contents are the same as the second contents.

20. The electronic apparatus according to claim 13, wherein the contents are image contents or audio contents.

21. The electronic apparatus according to claim 13, wherein the electronic apparatus is an E-book device.

22. The electronic apparatus according to claim 13, wherein if the link is selected while the contents screen which includes the second part is displayed, the first part is displayed to overlap the second part.

23. The electronic apparatus according to claim 13, wherein the control unit selects the first part and the second part to be linked based on a user requirement and forms the link based on the user requirement.

24. The electronic apparatus according to claim 13, wherein the controlling unit controls the display unit to display the link storage area on the contents screen.

* * * * *